United States Patent [19]
Van der Woude et al.

[11] Patent Number: 4,883,394
[45] Date of Patent: Nov. 28, 1989

[54] COVER WITH INTEGRAL FASTENING MEANS

[75] Inventors: Gerbrig W. Van der Woude, Rock Island; Timothy M. Moore, Silvis, both of Ill.

[73] Assignee: Polyco, Inc., Moline, Ill.

[21] Appl. No.: 258,751

[22] Filed: Oct. 14, 1988

Related U.S. Application Data

[63] Continuation-in-part of Ser. No. 105,361, Oct. 7, 1987.

[51] Int. Cl.$^4$ .......................... F16B 13/06; B44D 5/08
[52] U.S. Cl. .......................................... 411/51; 411/55; 411/60; 411/908; 52/180
[58] Field of Search .............................. 411/21, 50–53, 411/55, 57, 60, 342, 344, 508, 907, 908, 913, 77; 52/180, 660, 673; 49/57

[56] References Cited

U.S. PATENT DOCUMENTS

| | | | |
|---|---|---|---|
| 2,159,580 | 5/1939 | Zifferer | 411/51 |
| 2,805,597 | 9/1957 | O'Shaughnessy, Jr. | 411/60 |
| 3,534,998 | 10/1970 | Johnson et al. | 49/57 |
| 3,836,704 | 9/1974 | Coules | 411/60 |
| 3,900,998 | 8/1975 | Hubbard | 411/60 |
| 3,914,911 | 10/1975 | Paasch | 52/180 |

FOREIGN PATENT DOCUMENTS

| | | | |
|---|---|---|---|
| 54438 | 10/1974 | Australia | 411/60 |
| 1092484 | 11/1954 | France | 411/51 |
| 1561625 | 3/1969 | France | 411/51 |

Primary Examiner—Neill R. Wilson
Attorney, Agent, or Firm—Henderson & Sturm

[57] ABSTRACT

The utility of a cover for vents or drains is improved by having a unitary, integral fastening means which can be used to either secure the covering so securely that mutilation of the cover may be required to remove the cover or that the cover may be easily removed and replaced. The cover can be formed from any polymer with any desired surface configuration, i.e., hole size and shape, and can be used to modify existing covers or as the original cover for a hole or vent. The fastening means when integral is made of the same material as the cover and can be easily expanded and secured by pressure elements. Since the normal sleeve has been replaced by the integral fastener which is part of the cover, no relative rotation of the sleeve and pressure means can occur.

1 Claim, 3 Drawing Sheets

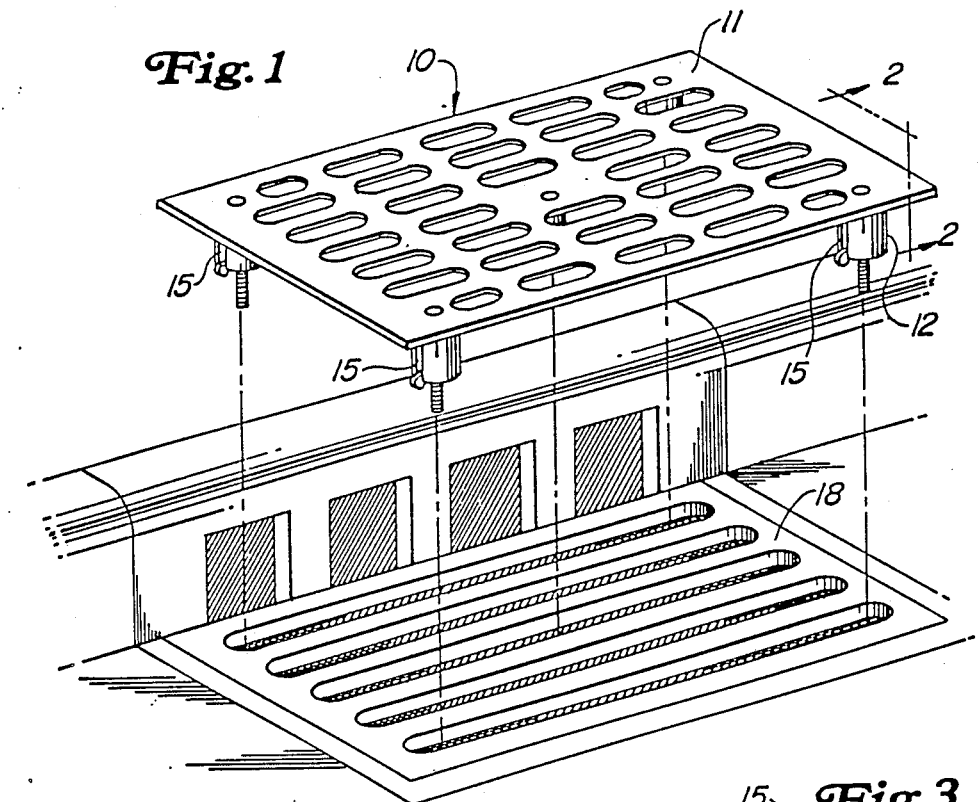
Fig. 1
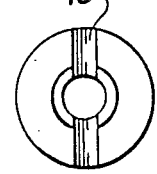
Fig. 3
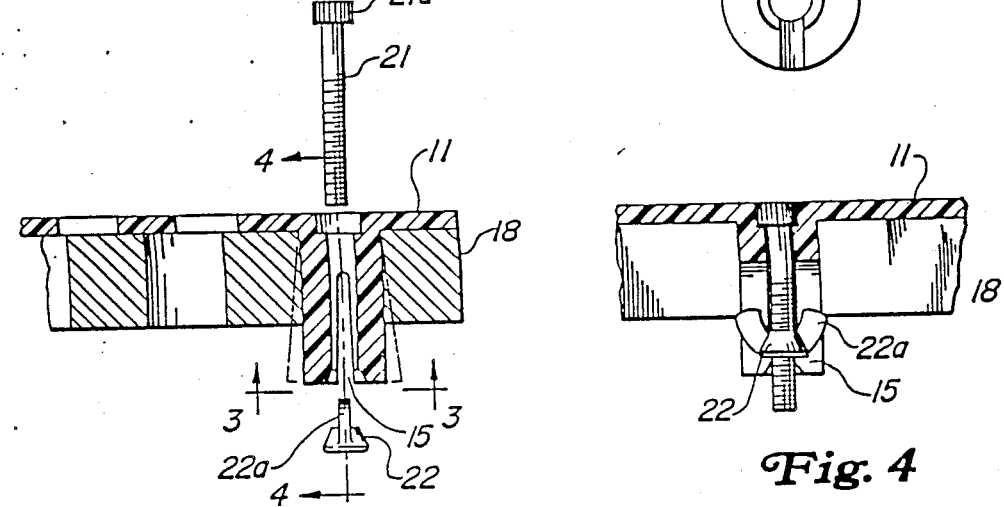
Fig. 2
Fig. 4

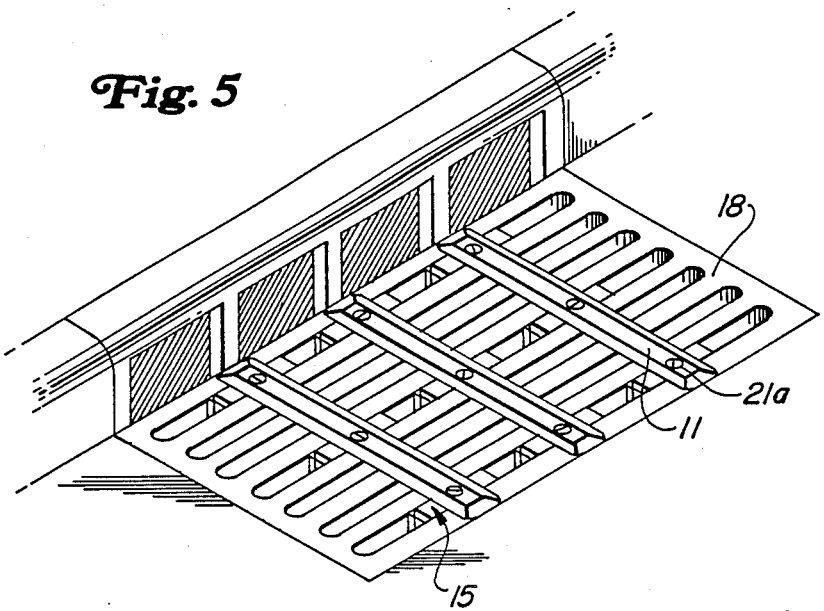
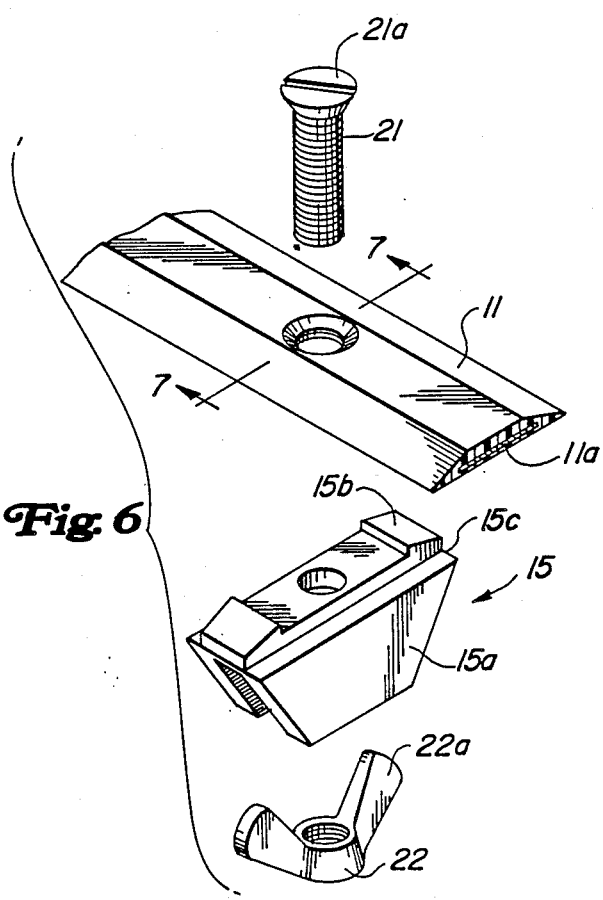
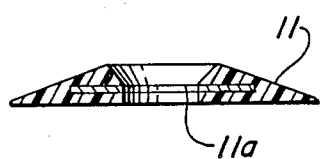
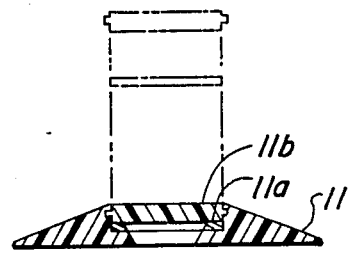

COVER WITH INTEGRAL FASTENING MEANS

This is a continuation-in-part of pending application Ser. No. 07/105,361, filed Oct. 7, 1987, which discloses grate covers of unitary design. The cover works well and makes a desired lattice configuration for grates especially sewer grates.

BACKGROUND OF THE INVENTION

The invention relates to a perforated cover for holes and vents which pass air or liquid and which pass air or liquid and which can modify existing covers, i.e., as to the size and shape of the apertures in the cover. Most prior art covers have been made of metal and especially prior art sewer drain covers for use on public streets. These prior art covers were usually made of cast iron and set into metal frames embedded in the concrete. They were made heavy to prevent theft and early models had large slots generally parallel with the street. These slots have caused accidents to bicycles and the riders. The wheels of the bicycle being abruptly caught in the slot and throwing the cycler. This cover will change the configuration of the existing cover to prevent the wheels of the cycle from dropping into the slots and yet retain all the strength of the original cover. The polymers from which the covers are made are strong, yet lightweight. Prior metal covers for many drains or vent can be covered or totally replaced by this cover.

SUMMARY AND OBJECTS OF THE INVENTION

It is an object of the present invention to provide a cover to modify existing covers for holes or vents that includes an unitary, integral, expansion fastener for securely holding the two covers together.

It is a further object to provide an individual cover element that can be used on existing bar grates to make a desired lattice configuration. This individual cover is held in place by a modification of the novel attachment means of the unitary cover.

It is a further object of this invention to provide a low cost cover which is also strong and resistant to most elements and which includes fastener means integral with the cover.

It is a further object of this invention to provide a fastening means in which the nut does not rotate freely about the bolt instead of expanding the sleeve during normal conditions of its use.

It is a further object of this invention to provide a low cost, lightweight cover for vents which has the fastening means integral with the cover and can be used in areas requiring resistance to acid and other corrosion materials.

A problem with fastening the cover of this invention to the drain cover was to ensure that the two covers were securely connected. The connection between them should be nearly permanent to prevent theft of the second cover from the original cover. This connection should be provided even if the nut and bolt providing the original expansion are subsequently removed.

The various objectives of this invention are achieved by having an expansion fastener, integral with the cover, which can be inserted in a hole in a second member or cover and manipulated so as to be expanded into engagement with or separate from the surface of the hole.

The expansion results from the force exerted by the turning of a threaded shaft having an ordinary wing nut with sloping exterior surfaces on one end of the shaft and a head capable of being turned by a tool on the other end.

The shaft extends through the fastener means and the wings of the wing nut are forced up into the slots formed in the fastener. The sides are forced outwardly by the action of the nut being secured within the slots until the desired forceful contact is made with the sides of the bars in the second member.

DESCRIPTION OF THE DRAWINGS

This invention is best more fully described in reference to the accompanying drawings in which:

FIG. 1 is an isometric view of a cover and fastener of this invention showing how the covers will fit together and the fasteners will operate.

FIG. 2 is a sectional view of the fastener portion of the cover and the fastener portions shown not assembled taken along line 2—2.

FIG. 3 is a plan view of the fastener taken along line 3—3.

FIG. 4 is a sectional view of the fastener means assembled and operable taken along lines 4—4.

FIG. 5 is a view of the individual cover unit of this invention held in place by the fastener of this invention.

FIG. 6 is an exploded view of the cover and fastener of this invention shown not assembled.

FIG. 7 is a plan view of the cover unit of this invention taken along line 7—7.

FIG. 8 shows a plan view of a modified cover unit also taken along lines 7—7.

Figure 9:
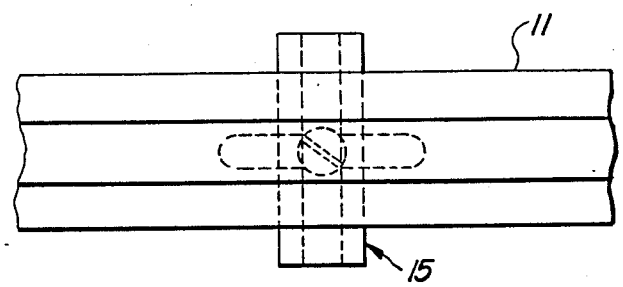
FIG. 9 is a top view of the cover unit of FIG. 7 in place.
Figure 10:
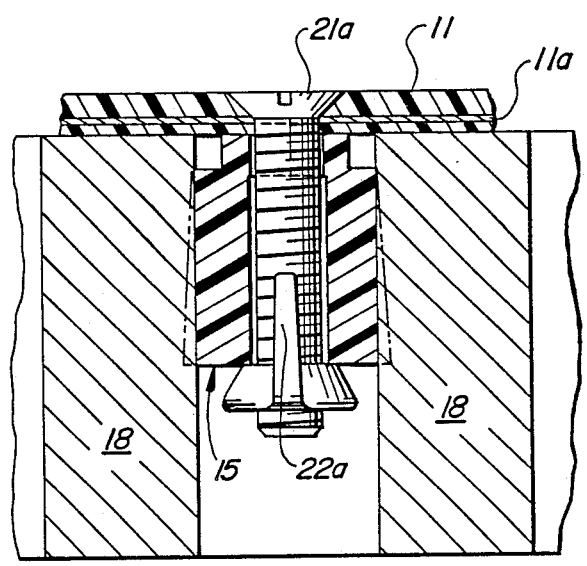
FIG. 10 is a sectional view of the cover unit and fastener unit assembled.

The particular cover and fastener shown are the presently preferred embodiment; however, those skilled in the art will be able to design different fasteners using the concepts of this invention as defined in the appended claims. For this reason the invention is not to be construed as being limited to covers and fasteners which are constructed exactly in the manner illustrated.

DETAILED DESCRIPTION OF A PREFERRED EMBODIMENT OF THE INVENTION

In the drawings, there is shown a cover (10) in which the cover portion (11) and the expansion portion (12) are all of one material and formed together as an integral member. This cover may be molded from any polymer but for the best corrosion resistance and strength characteristics polypropelene and/or polyethelene is recommended. The thickness of the cover and dimensions can be varied to fit any particular requirements. The expansion members are cast with hollow centers and the longitudinal slots (15) can be formed or cut into the expansion member (12) after forming. These expansion members (12) can be sized and located anywhere on the cover to snugly fit into holes into the surface to which the cover of this invention is to be attached. The cover is normally positioned on the surface of the existing cover (18). When the cover (12) is positioned adjacent cover (18), the fastener means including bolt (21) with a proper head (21a) and wing nut (22) are positioned within the fastener means. The fastener (12) serving also as the normal sleeve for an expansion fastener, provides with the slots, a positive fit so that there is no relative motion permitted between the fastener or sleeve and the nut as the head is turned. Thus, as contrasted to the prior art, this invention requires no strict dimensioning of the fastener sleeve to the dimension of the hole of the second member, the cover being the first member, to prevent relative rotation of the sleeve and the second member as the shaft is turned. The fastener means of this cover can also be utilized separately, i.e., without connection to the cover but to hold two members together as shown in U.S. Pat. No. 4,474,515 showing an improved expansion fastener. Thus if the cover (10) was a member (10) to be held securely to cover or member (18), the fastener means (12) being now a separate part could be modified by making head (21a) large enough to cover the desired portion of surface (11) and with a hole in surface (11) large enough to accept the fastener (12). A new, inexpensive expansion fastener is then provided where there still will be no relative rotation of the sleeve to the second member as the wing portion of nut (22) will be firmly held in slots (15).

As the head (21a) and bolt (21) are turned, the nut (22) and wing portions (22a) are drawn together and force the sides (12a) of the fastener means (12) outwardly. The deformation of the polymer will frictionally engage the sides of member (18) with any desired force such that the two members can be separated only with great difficulty or can be easily removed. The polymer, because of its natural characteristic of having what is called a poor memory will retain its new position even if the bolt and nut are removed. This ensures that the natural lubricating of the polymer assists in removal when that function is desired rather than positive mating of the two members.

The wings (22a) can be designed to conform to the exterior dimensions of the expansion member (12) but use of available wing nuts, merely reversing the normal direction of the wing, provides an economical nut for the fastening means.

As shown in FIGS. 5-10 there is a cover unit (11) which is similar to cover (11) in FIGS. 1-4 but which is modified to act as a single cover for a bar grate. Any number of cover units (11) can be placed on a grate to get the desired lattice work. The unitary cover unit (11) has sloping sides to permit passage of equipment over the grate and cover without destroying the cover. A metallic strip (11a) may be molded in the unit cover, if necessary, to improve its strength. Holes are provided in covers and fastener means to insert bolts (21).

The separate fastener means (15) is a U-shaped channel member rather than cylindrical as in the unitary cover described above. This permits a greater surface (15a) to contact the bars of the grate (18). The channel shaped fastener has a crown portion (15b) shaped to fit the cover unit (11) and help prevent longitudinal movement of the unit (11) when installed. The fastener also a recess (15c) so that the sides (15a) are connected to the crown (15b) with a membrane of desired thickness to permit the sides (15a) to expand from the center as the nut (22) is forced into the slot of the fastener unit. The individual cover unit can also be made as shown in FIG. 8 and 9. The cover unit (11) can be formed with a channel into which the metal plate (11a) can be inserted and a plastic plate (11b) can then be inserted over the metal plate (11a). The cover unit would be attached to the grate as before but the screw head (21a) would then be covered by the plastic plate or member (11b). The function would be the same as before but removal would be discouraged as the screw head (21a) would be hidden.

As will be apparent to persons skilled in the art, there are modifications, adaptations and variations from the foregoing specific disclosure which can be made without departing from the teachings of the present invention. Although this invention has been described with sufficient clarity that those skilled in the art may make and use, what is claimed and desired to be secured by Letters Patent is:

I claim:

1. An expansion fastener for grates which is adapted to be supported from a hole in a cover member in such a manner as to be inserted between the bars of a grate and manipulated so as to expand into engagement with the surfaces of the bars of said grate, said fastener including a "U" shaped channel member having two planar sides and the third side having a predetermined configuration and a hole therein, an externally threaded shaft with a manipulative head larger than the hole in said cover member inserted in said hole in said channel member;

a nut having a conical face with lateral extensions 180° apart threaded on said shaft;

said planar sides of said channel member expanding as said nut is rotated on and therefore restrained as said shaft is rotated to secure the channel member to the sides of said bars.

* * * * *